United States Patent Office 3,299,344
Patented Jan. 17, 1967

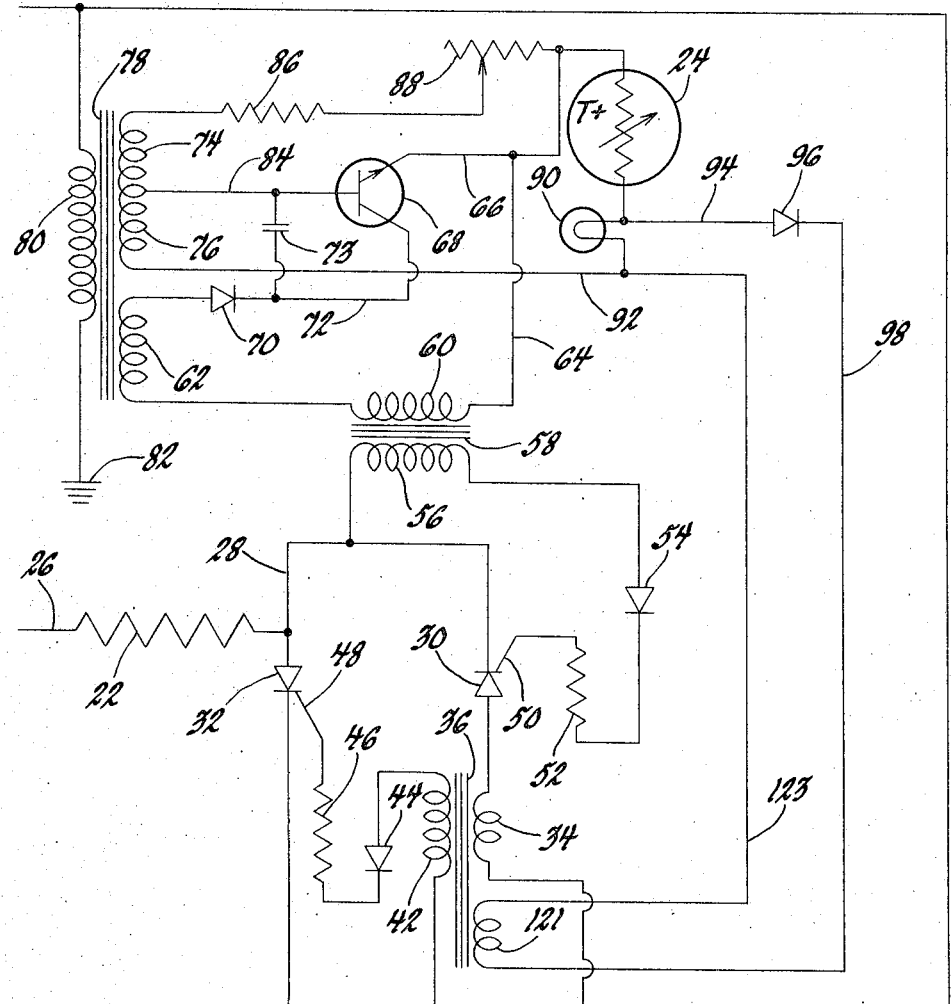

3,299,344
FULL WAVE VOLTAGE CONTROL SYSTEM FOR HEATING LOAD
Merle E. Werts, Piqua, Ohio, assignor to General Motors Corporation, Detroit, Mich., a corporation of Delaware
Filed Mar. 11, 1964, Ser. No. 350,990
3 Claims. (Cl. 323—22)

This invention pertains to electrical apparatus and more particularly to the control of an electrical load such as the thermostatic control of the surface heaters of electric stoves and ranges.

The thermostatic control of surface heaters attained mass production a few years ago. However, their use was limited to the high priced models and ordinarily only one was provided on each stove range. Moreover the problem of obtaining maximum initial heating without overshooting the selected temperature has not been solved in any inexpensive system.

It is an object of this invention to provide a reliable inexpensive surface heater control system which will rapidly bring the cooking utensil up to the temperature desired without overshooting.

It is another object of this invention to provide a reliable inexpensive surface heater control system in which the anticipating system for preventing overshooting varies the current through a light bulb to vary its resistance for controlling the current through the surface heater.

These and other objects are attained in the form shown in the drawings in which two silicon control rectifiers are arranged oppositely in parallel circuit with each other and in series with the surface heater of an electric range. These two rectifiers are arranged in a master-slave relationship through the use of a transformer in series with the master rectifier and having its output used to apply a firing voltage to the gate of the slave rectifier. This same transformer has an additional output coil which is connected to pass a current through an automobile lamp or similar resistance connected in series with the pan temperature responsive resistance both of which are arranged in a leg of a transformer energized bridge circuit to control current flow through a transistor. The transistor controls the flow of current in another transformer circuit which applies a varying voltage to the gate of the master silicon control rectifier to cause it to conduct or not to conduct according to the unbalance or balance of the bridge circuit.

Further objects and advantages of the present invention will be apparent from the following description, reference being had to the accompanying drawings wherein a preferred embodiment of the present invention is clearly shown.

In the drawings:

FIGURE 1 is a top view of a surface heater embodying one form of my invention; and FIGURE 2 is a wiring diagram for the surface heater shown in FIGURE 1 also embodying my invention.

Referring now to the drawing, there is shown the top 20 of an electric stove or range provided with an electric surface heater 22 within the center of which is a spring mounted temperature responsive resistance element 24 adapted to contact the bottom of a pan or other utensil supported on the heater 22. This temperature responsive resistance 24 may, for example, be of the positive type having a resistance of about 10 ohms at 77° F., and 20 ohms at 475° F. Temperature responsive resistances of this type are manufactured by the King Sealy Corporation.

One terminal of the heater 22 is connected to one 236 volt supply conductor 26 while the other terminal is connected to a parallel circuit 28 containing the master silicon controlled rectifier 30 and the slave silicon controlled rectifier 32 arranged oppositely in parallel circuit with each other and in series with the surface heater 22. As shown, the cathode electrode of the master rectifier 30 and the anode electrode of the rectifier 32 are connected to the surface heater 22. The anode electrode of the master rectifier 30 is connected through the 6-turn winding 34 of the 3-winding transformer 36 with the conductor 38 connecting the cathode electrode of the slave rectifier 32 with the second 236 volt supply conductor. The transformer 36 is provided with a second winding 42 of about 120 turns having one terminal connected to the conductor 38 and the other terminal connected through a diode rectifier 44 and a fixed resistance 46 with the gate 48 of the slave rectifier 32. Whenever the master rectifier 30 fires or conducts, for one half cycle, the current passing through the winding 34 will generate a higher voltage in the winding 42 which is applied to cause the slave rectifier 32 to fire or conduct the following half cycle.

The firing of the master rectifier 30 is controlled by the voltage applied to its gate 50 which is connected through a fixed resistance 52 and a rectifier 54 with the output winding 56 of a transformer 58. The second terminal of the winding 56 is connected to the conductor 28. When the voltage applied to the gate 50 is sufficiently positive relative to the conductor 28 connected to its cathode, the master rectifier 30 will be caused to conduct for one-half cycle and through the transformer 36 will cause the slave rectifier 32 to conduct for the following half cycle.

The transformer 58 is provided with an input winding 60 having one terminal connected to the 6-volt output winding 62 and the other terminal connected through the conductors 64 and 66 with the emitter of the silicon transistor 68. The opposite terminal of the 6-volt output winding 62 is connected through the rectifier 70 and the conductor 72 to the collector of the transistor 68. The transistor 68 controls the flow of current through this transformer circuit to apply through the transformer 58 the diode 54, and the resistance 52 a variable voltage upon the gate 50 sufficient to cause the master rectifier 30 to either conduct or not to conduct.

The current flow through the transistor 68 is controlled by a bridge circuit energized from the dual output windings 74 and 76 of a transformer 78. The transformer 78 has a 110 volt input winding 80 connected between the conductor 40 and the ground 82 for energizing the output winding 62 at about 6 volts and each section 74 and 76 of the second output winding at about 3 volts. The terminal between the two sections 74 and 76 is connected by the conductor 84 to the base of the transistor 68. A capacitor 73 is connected between the conductors 84 and 72. The second terminal of the section 74 is connected through the fixed resistance 86 of about 15 ohms and through a temperature controlling customer-selected variable resistance 88 to the conductor 66. The variable resistance 88 has a selective resistance of 0–20 ohms. The conductor 66 also connects to one terminal of the temperature responsive resistance 24. The other terminal of the temperature responsive resistance 24 connects to one terminal of a resistance in the form of a tungsten filament automobile lamp 90 of 6–8 volt 2-candle power rating which has its other terminal connected to the conductor 92. This conductor 92 connects to the second terminal of the output winding 76 to complete the bridge circuit.

After the variable resistance 88 is moved to select the temperature of the pan which is to be reached and maintained, the bridge circuit will be unbalanced because the temperature of the resistance 24 will be substantially below the temperature selected and likewise its resistance will be substantially below the resistance of the resistances 86 and 88. This will cause the application of a positive base to emitter voltage to the transistor 68 which will cause it to conduct and through the transformer 58, the rectifier 54, and the resistance 52 to apply a voltage to the gate 50 sufficient to cause the master silicon controlled rectifier 30 to conduct for complete half cycles as a sufficiently high voltage is applied to the gate 50. Through the transformer 36, the voltage will be sufficient when applied to the gate 48 to cause the slave silicon controlled rectifier 32 to conduct for each complete half cycle following each half cycle that the master rectifier 30 conducts. This will cause the electric heater 22 to be energized with alternating current until the bridge circuit becomes substantially balanced. However, it has been found that the heat stored in the surface heater 22 during this rise in temperature is sufficient to cause an overshoot.

To avoid this overshoot, I have provided the 6-8 volt, 2-candle power tungsten filament automotive lamp 90 as a variable resistance in series with the positive temperature responsive resistance 24. This lamp, for example, may be a G.E. No. 55 lamp. I find that this lamp provides a very simple way of preventing this overshoot. To accomplish this, the one terminal of the lamp 90 is connected through the conductor 94, the diode 96, and the conductor 98, with the 125 turn second output winding 121 of the transformer 36 which supplies about 2 volts. The second terminal of the winding 121 is connected by the conductor 123 to the conductor 92 which connects to the second terminal of the lamp 90. This causes the operation of the lamp 90 at a very low level of illumination which varies in accordance with the conduction of current through the heater 22. The current passes through the heater 22 100% of the time during the initial portions of the warm-up period. The lamp 90 will therefore be energized to the maximum extent at the beginning of this heating period and this energization will cause it to have the maximum resistance during the initial warm-up period. This maximum resistance added to the increasing resistance of the temperature responsive resistance 24 will cause the bridge circuit to become balanced before the resistance 24 reaches the temperature selected by the resistance 88. The current flow through the lamp 90 and its temperature will then reduce along with the reduction in current flow through the heater 22 as more and more half cycles are skipped so that its resistance will reduce correspondingly. This reduction in resistance of the lamp 90 together with the increase in resistance of the temperature resistance 24 will reduce the current flow through the heater 22 as the selected temperature is approached in order to reduce the rate of temperature rise in the heater 22 sufficiently to compensate for the tendency of the heater 22 to overshoot in temperature due to the stored heat being developed therein. This lamp 90 therefore serves as an anticipator for counteracting the natural tendency to overshoot the selected temperature so as to minimize overshooting. The lamp 90 provides a hermetically sealed resistance which is inexpensive and very long-lived and achieves a large variation in current flow with a minimum power loss. Only an additional transformer winding in addition to lamp 90 and the rectifier 96 is required to obtain this anticipation.

The diodes 44, 54, 70, and 96 may be designated as 1N-536. The rectifiers 30 and 32 are known as G.E. No. C-15D and the transistor as 2N2711. The lamp 90 may have a tungsten filament and is known as G.E. No. 55. The windings 60 and 56 of the transformer 58 may be in proportion of three to two. This arrangement provides an efficient, inexpensive surface heater control embodying reliable solid state elements which prevents any substantial overshoot and attains the desired temperature quickly.

While the embodiment of the present invention as herein disclosed, constitutes a preferred form, it is to be understood that other forms might be adopted.

What is claimed is as follows:

1. In combination, an electrical heat dissipating load, an alternating current energy supply electrically connected to supply energy to said load, a voltage responsive semiconductor control means having electrodes connected in series with said load for controlling the supply of energy from said supply to said load, preponderantly inductive circuit means for repeatedly applying to said control means a voltage peak substantially at the time in the application of the alternating voltage sine wave to said control means when the voltage passes through zero comprising a first transformer having input terminal means connected to said energy supply and output terminal means, a second transformer having input and output terminal means, means comprising first conductor means and a current control means and a rectifier connecting the output terminal means of said first transformer with the input terminal means of said second transformer, second conductor means connecting the output terminal means of said second transformer with two electrodes of said semiconductor control means for controlling the energy supply to said load in substantially complete half cycles in response to said current control means, said current control means comprising circuit means energized by said energy supply and a filament lamp connected in series with said circuit means, and means for additionally energizing said lamp in response to current flow through said load.

2. In combination, an electrical heat dissipating load, an alternating current energy supply electrically connected to supply energy to said load, a voltage responsive semiconductor control means having electrodes connected in series with said load for controlling the supply of energy from said supply to said load, preponderantly inductive circuit means for repeatedly applying to said control means a voltage peak substantially at the time in the application of the alternating voltage sine wave to said control means when the voltage passes through zero comprising a first transformer having input terminal means connected to said energy supply and output terminal means, a second transformer having input and output terminal means, means comprising first conductor means and a current control means and a rectifier connecting the output terminal means of said first transformer with the input terminal means of said second transformer, second conductor means connecting the output terminal means of said second transformer with two electrodes of said semiconductor control means for controlling the energy supply to said load in substantially complete half cycles in response to said current control means, said current control means comprising circuit means energized by said energy supply and a filament lamp and a temperature responsive resistance connected in series with said circuit means, said temperature responsive resistance being located in heat transfer relation with said load, and means for additionally energizing said lamp in response to current flow through said load.

3. In combination, an electrical heat dissipating load, an alternating current energy supply electrically connected to supply energy to said load, a voltage responsive semiconductor control means having electrodes connected in series with said load for controlling the supply of energy from said supply to said load, preponderantly inductive circuit means for repeatedly applying to said control means a voltage peak substantially at the time in the application of the alternating voltage sine wave to said control means when the voltage passes through zero comprising a first transformer having input terminal means connected to said energy supply and output terminal means, a second transformer having input and output terminal means, means comprising first conductor means and a current control means and a rectifier connecting the output terminal means of said first transformer with the input terminal means of said second transformer, second conductor means connecting the output terminal means of said second transformer with two electrodes of said semiconductor control means for controlling the energy supply to said load in substantially complete half cycles in response to said current control means, said current control means comprising circuit means energized by said energy supply and a filament lamp connected in series with said circuit means, a third transformer having an input winding connected in series with said semiconductor control means and having an output winding, a silicon controlled rectifier connected in parallel electrical circuit with said semiconductor control means and in series with said load, said silicon control rectifier having a gate connected to said output winding of said third transformer, said output winding being also connected to another electrode of said silicon controlled retifier, said filament lamp having terminals, said third transformer also having output terminals connected to the terminals of said filament lamp.

References Cited by the Examiner

UNITED STATES PATENTS

| | | | |
|---|---|---|---|
| 2,488,580 | 11/1949 | Burleigh | 219—500 X |
| 2,763,831 | 9/1956 | Uiga | 323—75 X |
| 2,998,547 | 8/1961 | Berman | 315—200 |
| 3,051,813 | 8/1962 | Busch et al. | 219—489 |
| 3,161,759 | 12/1964 | Gambill | 219—494 |
| 3,175,076 | 3/1965 | Fox et al. | 219—494 |
| 3,175,077 | 3/1965 | Fox et al. | 219—494 |
| 3,196,255 | 7/1965 | Beauchamp et al. | 219—497 |
| 3,240,916 | 3/1966 | Bray et al. | 219—501 |

JOHN F. COUCH, *Primary Examiner.*

W. E. RAY, *Assistant Examiner.*